(12) United States Patent
Nick (10) Patent No.: US 8,056,541 B1
(45) Date of Patent: Nov. 15, 2011

(54) INTERNAL COMBUSTION ENGINE HAVING AN ELECTRIC SOLENOID POPPET VALVE AND AIR/FUEL INJECTOR

(75) Inventor: Donald O. Nick, Ocala, FL (US)

(73) Assignee: DONICK ENGINES, Inc.

( * ) Notice: Subject to any disclaimer, the term of this patent is extended or adjusted under 35 U.S.C. 154(b) by 0 days.

(21) Appl. No.: 12/661,972

(22) Filed: Jun. 22, 2010

(51) Int. Cl.
*F02M 23/04* (2006.01)

(52) U.S. Cl. .................. 123/533; 123/65 SP; 123/79 R; 123/90.11

(58) Field of Classification Search ................ 123/73 C, 123/74 A, 74 AA, 65 E, 65 VD, 65 SP, 79 R, 123/531–534, 90.11, 90.23, 303
See application file for complete search history.

(56) References Cited

U.S. PATENT DOCUMENTS

| | | | | |
|---|---|---|---|---|
| 1,988,309 | A * | 1/1935 | Ford | 123/257 |
| 3,993,030 | A * | 11/1976 | Jaulmes | 123/470 |
| 4,566,408 | A * | 1/1986 | Lapeyre | 123/51 B |
| 5,154,141 | A * | 10/1992 | McWhorter | 123/21 |
| 5,762,040 | A * | 6/1998 | Taipale et al. | 123/299 |
| 6,125,803 | A * | 10/2000 | Hattori et al. | 123/90.11 |
| 6,257,182 | B1 * | 7/2001 | Hara et al. | 123/90.11 |
| 6,273,038 | B1 * | 8/2001 | Kutlucinar et al. | 123/79 R |
| 6,289,858 | B1 * | 9/2001 | Altdorf et al. | 123/90.11 |
| 6,304,161 | B1 * | 10/2001 | Schebitz et al. | 335/255 |
| 6,494,172 | B2 * | 12/2002 | Komatsu et al. | 123/90.11 |
| 6,657,847 | B1 * | 12/2003 | Wright et al. | 361/160 |
| 6,681,728 | B2 * | 1/2004 | Haghgooie et al. | 123/90.11 |
| 6,691,649 | B2 * | 2/2004 | Zauner et al. | 123/73 B |
| 6,997,146 | B2 * | 2/2006 | Yoeda et al. | 123/90.11 |
| 7,099,136 | B2 * | 8/2006 | Seale et al. | 361/152 |
| 7,409,933 | B2 * | 8/2008 | Nino | 123/65 R |
| 2001/0047780 | A1 * | 12/2001 | Komatsu et al. | 123/90.11 |
| 2001/0054410 | A1 * | 12/2001 | Milam | 123/296 |
| 2002/0069843 | A1 * | 6/2002 | Miller | 123/90.11 |
| 2002/0179026 | A1 * | 12/2002 | Laimbock | 123/73 C |
| 2003/0107015 | A1 * | 6/2003 | Mianzo et al. | 251/129.04 |
| 2003/0217714 | A1 * | 11/2003 | Yoeda et al. | 123/90.11 |
| 2004/0083993 | A1 * | 5/2004 | Seale et al. | 123/90.11 |

* cited by examiner

*Primary Examiner* — Erick Solis (57) ABSTRACT

The invention presents new and useful improvements in the mechanical design of control elements of a reciprocating piston engine. The camshaft is replaced by electric magnetic solenoids that operate a single poppet valve for each cylinder. The invention also includes an air injector combined with a fuel injector, mounted through the engine block and into the cylinder. The injectors are located in the lower ⅓ of the piston stroke area of said cylinder. The ability of the air injector to force air into the cylinder while the poppet valve is open will clean the cylinder of all exhaust gases. With the poppet valve closed the air and fuel injectors can inject any amount of air fuel mixture that is desired into the cylinder, resulting in the possibility of a power boost equal to that of a supercharged engine.

4 Claims, 12 Drawing Sheets

INTERNAL COMBUSTION ENGINE HAVING AN ELECTRIC SOLENOID POPPET VALVE AND AIR/FUEL INJECTOR

BACKGROUND OF THE INVENTION

The invention relates to the intake of air and fuel mixture process of a piston driven internal combustion engine which operate on either the two stroke principle or the four stroke principle. In particular, the invention provides an unique way to improve performance and economy of piston driven internal combustion engine. In the design of most standard engines, two valves are employed in the cylinder head to control the unidirectional flow through their corresponding parts and are thus able to regulate the flow of air charge to the engine cylinder and flow of combustion gas from the engine cylinder. The newer high performance engines in use today's automobiles now contain as many as four such poppet valves per cylinder. This has been done primarily to improve volumetric efficiency. However on the intake stroke of the engine, the piston still has to draw fuel from the intake manifold into the cylinder through the intake valve opening of the engine. A unique feature of the invention is seen in its ability to provide relief to the engine by injecting an air and fuel mixture into the cylinder at the discretion of the amount of pressure placed on the air injector along with the amount of pressure on the fuel injector, and not depending on the amount of the vacuum created by the down stroke of the piston. The amount of air fuel mixture could be raised to that of a supercharger with out the use of a supercharger. By keeping the high pressure on the fuel injector will reduce the size of the fuel droplets, which will increase the economy of the engine.

Another unique feature of this invention is the use of Electric Magnetic Solenoid to operate the single valve in place of the conventional camshaft. It could operate as four stroke internal combustible engine or a two stroke internal combustible engine. In addition, if the valve is held open and the fuel injector is shut down it would reduce the engine of that cylinder. Another unique feature of this engine is that the automobile manufacturer could reduce to the need of only one engine for all cars or trucks. For example, if a five cylinder engine were used it could be boost to a engine producing 400 or 500 horse power at the same time reduce the use of cylinders to a 3 cylinder or 4 cylinder engine increasing the fuel mileage to a very high degree.

SUMMARY OF THE INVENTION

The present invention is a internal combustion engine having a unique Electric Magnetic Solenoids to operate the single poppet valve in each cylinder. The spark plug is located in the cylinder head in a position to allow the poppet valve to be of the maximum size. The Electric Magnetic Solenoid eliminates valve float at high RPM also the poppet valve is full open or full closed instantly, not like engine that depends on the rotation of a camshaft.

The present invention also introduces the concept of injection of fresh air and cool fuel through the cylinder wall. The injectors are located at the lower position of the cylinder. Using this concept it is possible to regulate the power band of the engine. With other internal combustion engines the amount of fuel mixture entering the cylinder depends on the volume of vacuum created by the down stroke of the piston, the size of the intake vale and the duration of the camshaft lobe lift. If it is required to increase the horse power it will be necessary to change the camshaft or add a turbo charger or add a supercharger. With the invention all that is required is to increase the throttle pressure. This action will increase higher air pressure to be released to the fresh air injector and increase the amount of air forced into the cylinder. It will also increase the fuel pressure to the fuel injector reducing the size of the fuel droplets allowing more fuel to be injected into the cylinder. The results of this action would be the same as installing a turbo charger or a supercharger to a normal internal combustion engine. To return to normal operation just reduce the throttle pressure. The same Electric Magnetic Solenoid can also be used to change the function of any cylinder by shutting down the poppet valve in a open position at the same time shutting off the fuel injector to that cylinder. This will cause the piston to free flow. The operator of this engine using this same action on other cylinders could have a choice of a 4, 5, 6, 7, or 8 cylinder engine.

BRIEF DESCRIPTION OF THE DRAWINGS

The object, features, and advantages will become more readily apparent from the following description reference being made to the accompanying drawings.

DETAIL DESCRIPTION OF THE INVENTION

Figure 1:
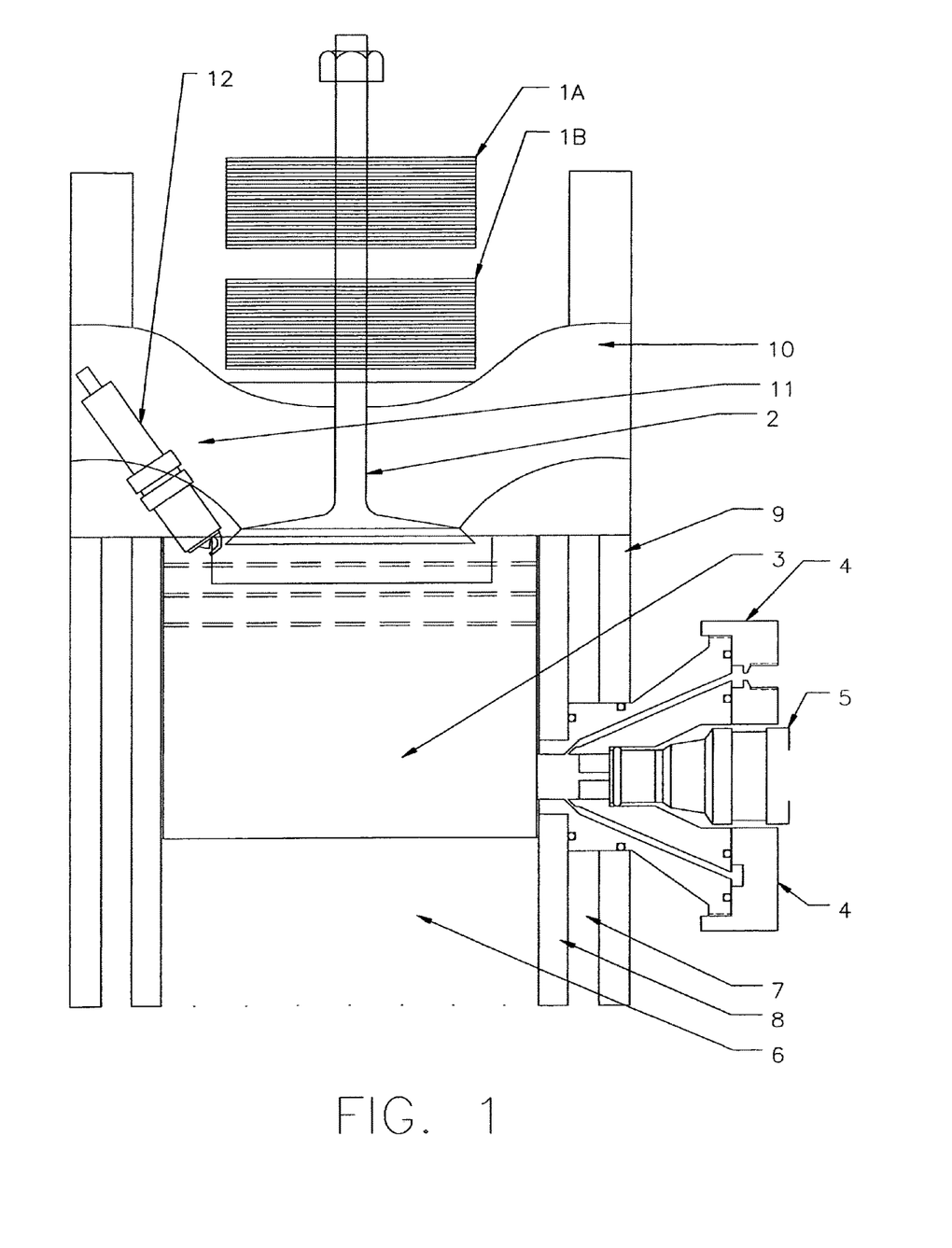
FIG. 1 is a schematic sectional view of the poppet valve in a closed position, the piston is at (TDC) top dead center, or firing position. This starts the power stroke and the moving of the piston in a downward motion.

Referring now to the drawings and to FIG. 1 there of in particular showing the principal of a new concept of an internal combustible engine.

FIG. 1 shows the use of an Electric Magnetic Solenoid 1A and 1B, to operate the poppet valve 2 of this engine. It will replace the use of the camshaft, push rods, valve springs, timing gears and timing chain. Eliminating these parts will improve the performance of the engine. FIG. 1 shows the Electric Magnetic Solenoid 1A retracting a single poppet valve 2 to a closed position. Using the Electric Magnetic Solenoid 1A and 1B will eliminate the duration lag time of the conventional camshaft lobe. The Electric Magnetic Solenoid 1A gives instant full opening position and 1B gives instant full closed position of the poppet valve 2. This action gives longer and better breathing time for the intake and exhaust strokes of the engine.

FIG. 1 shows the piston 3 at top dead center (TDC). This Fig. shows the piston 3 at the end of the compression stroke. At this position of the piston 3 the spark plug 12 will fire, causing the explosion of the air fuel mixture, starting the expansion stroke.

Figure 2:
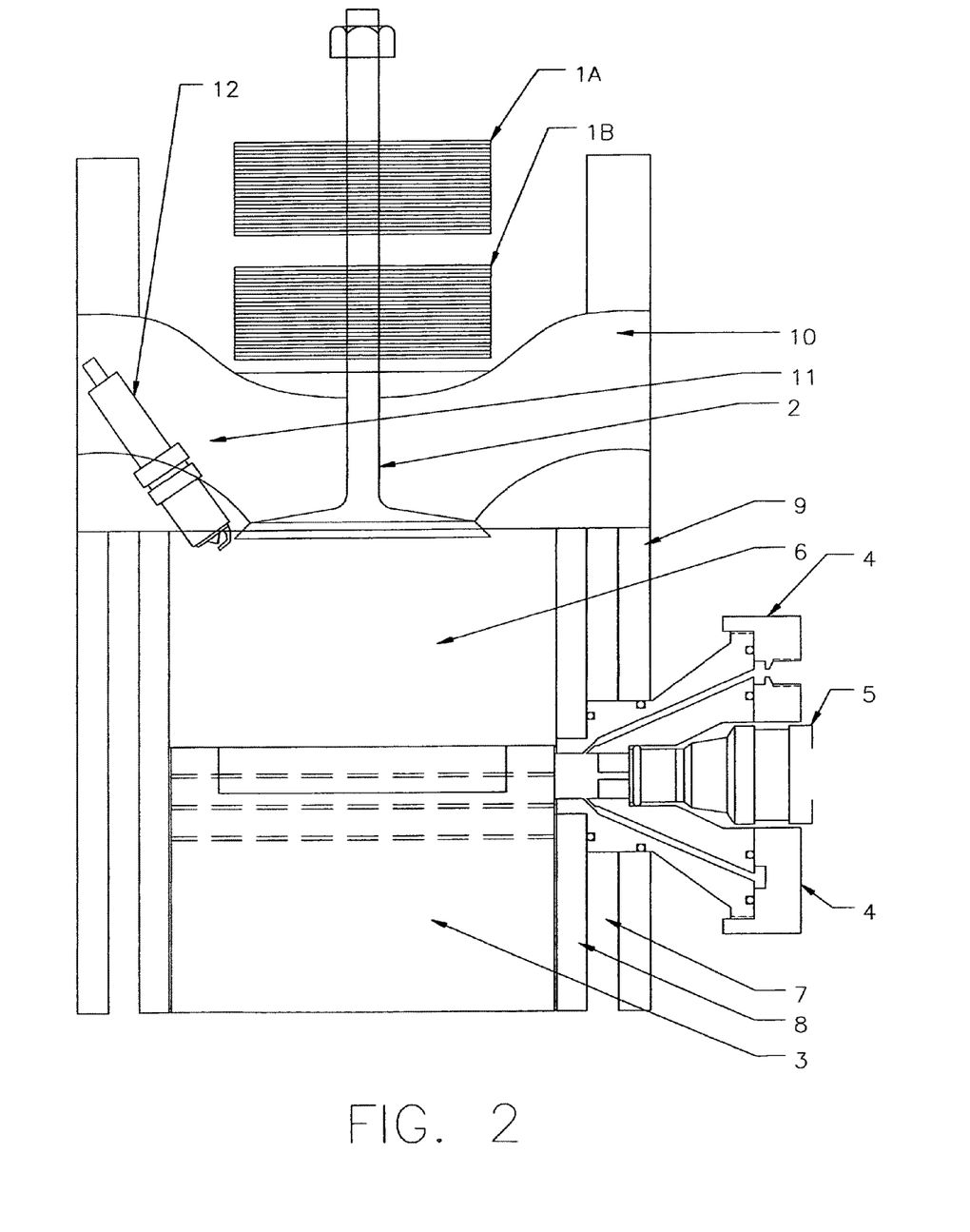
FIG. 2 is a schematic sectional view of the poppet valve in a closed position with the piston just above the fuel and air injector mixing chamber opening to the cylinder.

FIG. 2 the poppet valve 2 remains closed giving full power to the expansion stroke.

Figure 3:
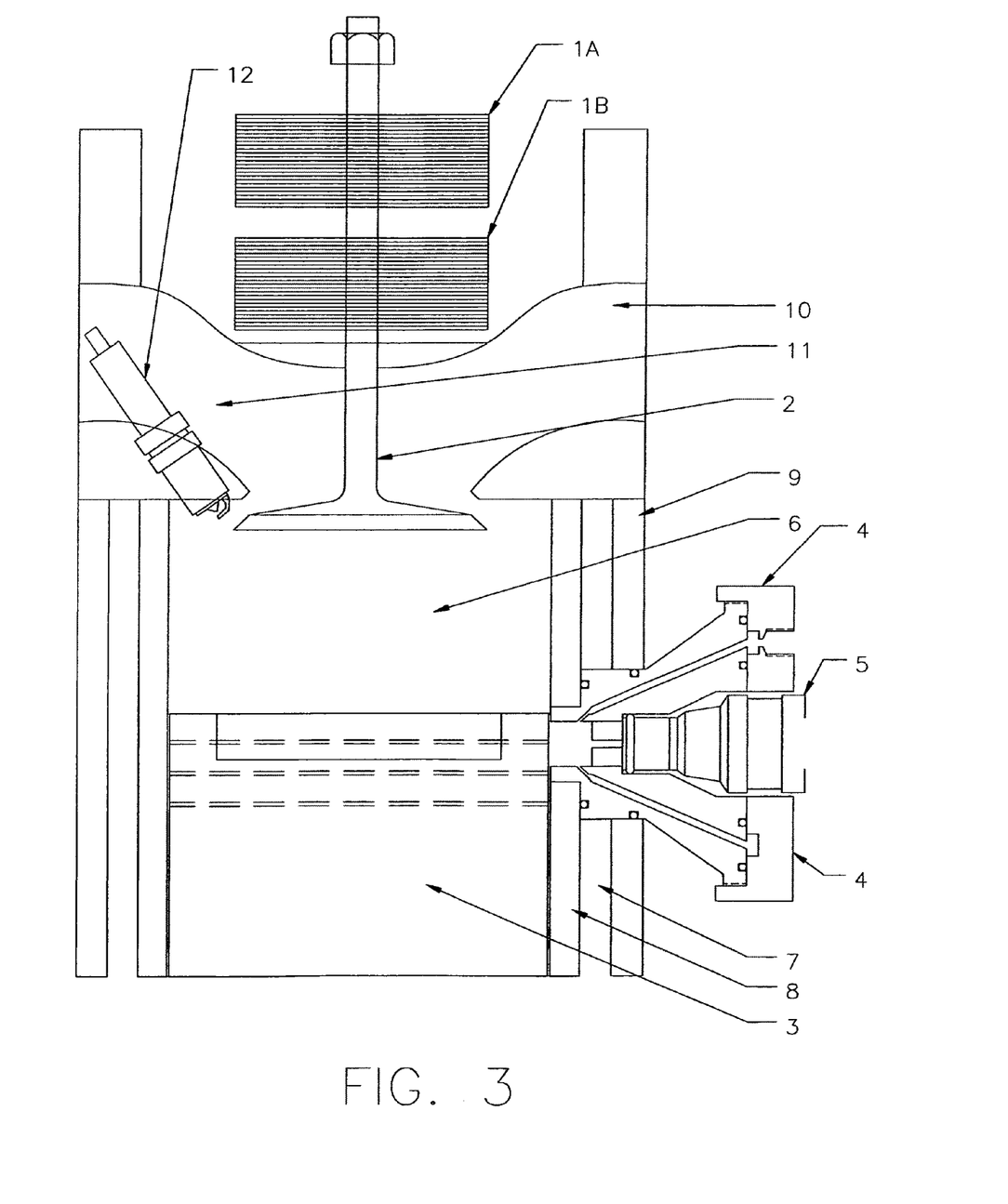
FIG. 3 is a schematic sectional view of the poppet valve in a open position. It is at this position of the piston that the poppet valve opens to relieve the pressure in the cylinder. As the piston passes the fuel and air injector mixing chamber opening, the air injector injects fresh air into the cylinder. This starts the process of forcing the exhaust gases out of the cylinder and filling the cylinder with cool fresh air.

FIG. 3 the poppet valve 2 has just open releasing the cylinder 6 of the burnt gases.

Figure 4:
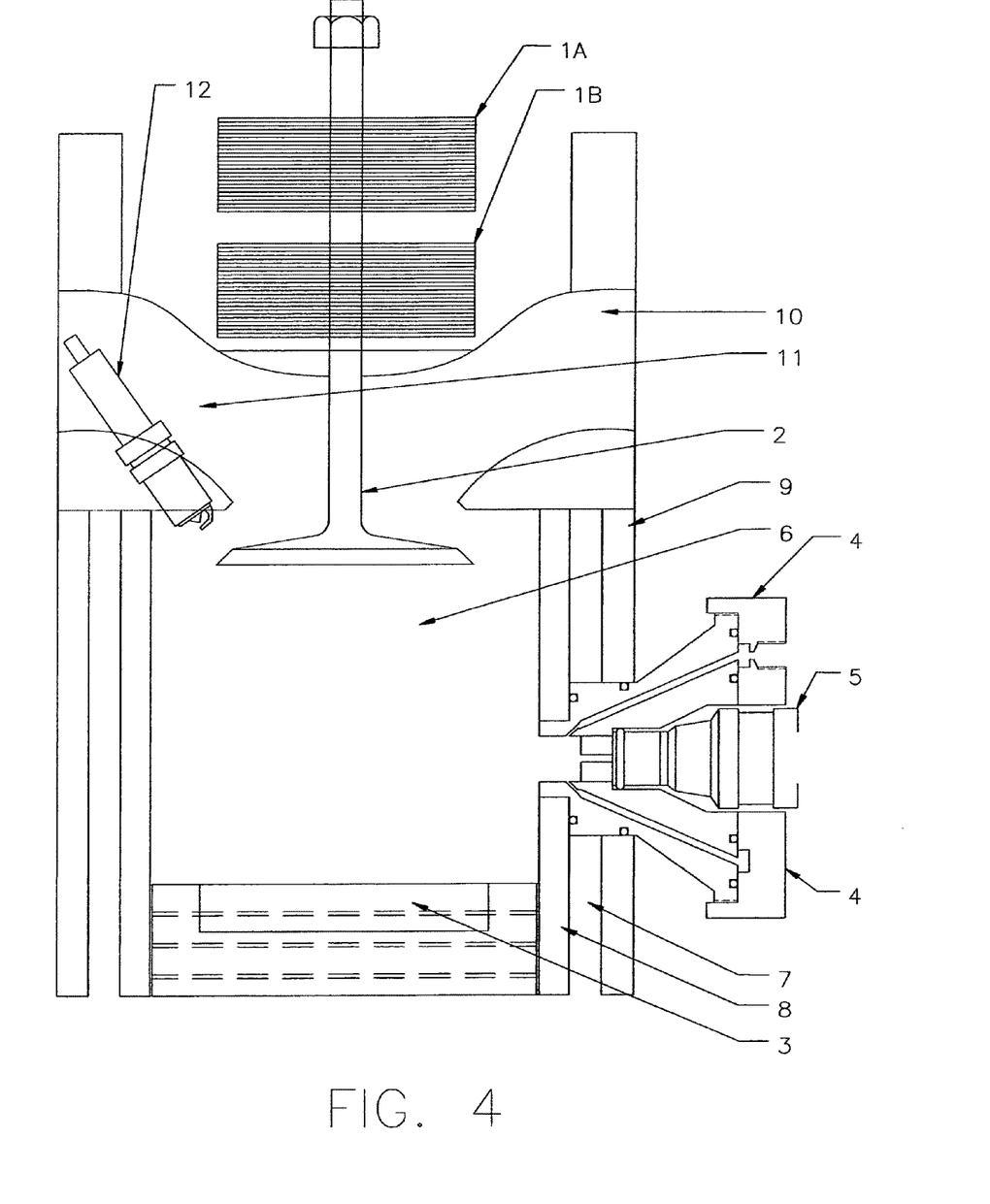
FIG. 4 is a schematic sectional view of the poppet valve in the open position, the piston is at (BDC) bottom dead center. The air injector continues to force fresh air into the cylinder.

FIG. 4 shows the piston 3 passing the air fuel injector mixing chamber 14. As the piston 3 passes the air fuel mixing chamber 14 the air injector 4 will start the process of injecting fresh air into the cylinder 6 forcing the exhaust gases past the poppet valve 2 and out the exhaust port bore 11. The injection of fresh air will continue through out the remainder of the piston 3 down stroke to the position of bottom dead center (BDC).

Figure 5:
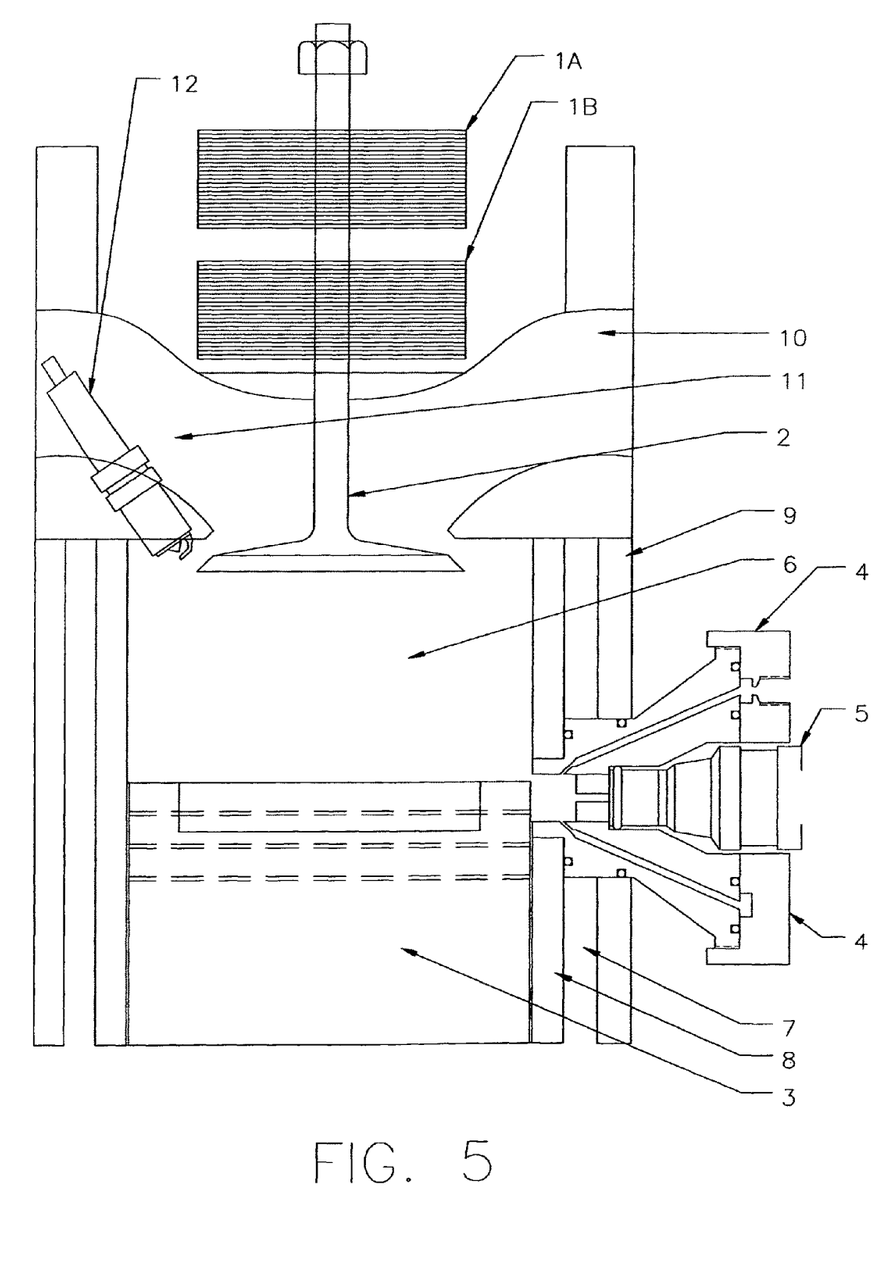
FIG. 5 is a schematic sectional view of the poppet valve still in the open position. The piston is in an upward motion forcing the balance of the air out of the cylinder.

FIG. 5 shows the piston 3 starting the exhaust stroke. The air injector 4 will continue to force fresh air into the cylinder until the piston 3 moves past the air fuel injector mixing chamber 14.

Figure 6:
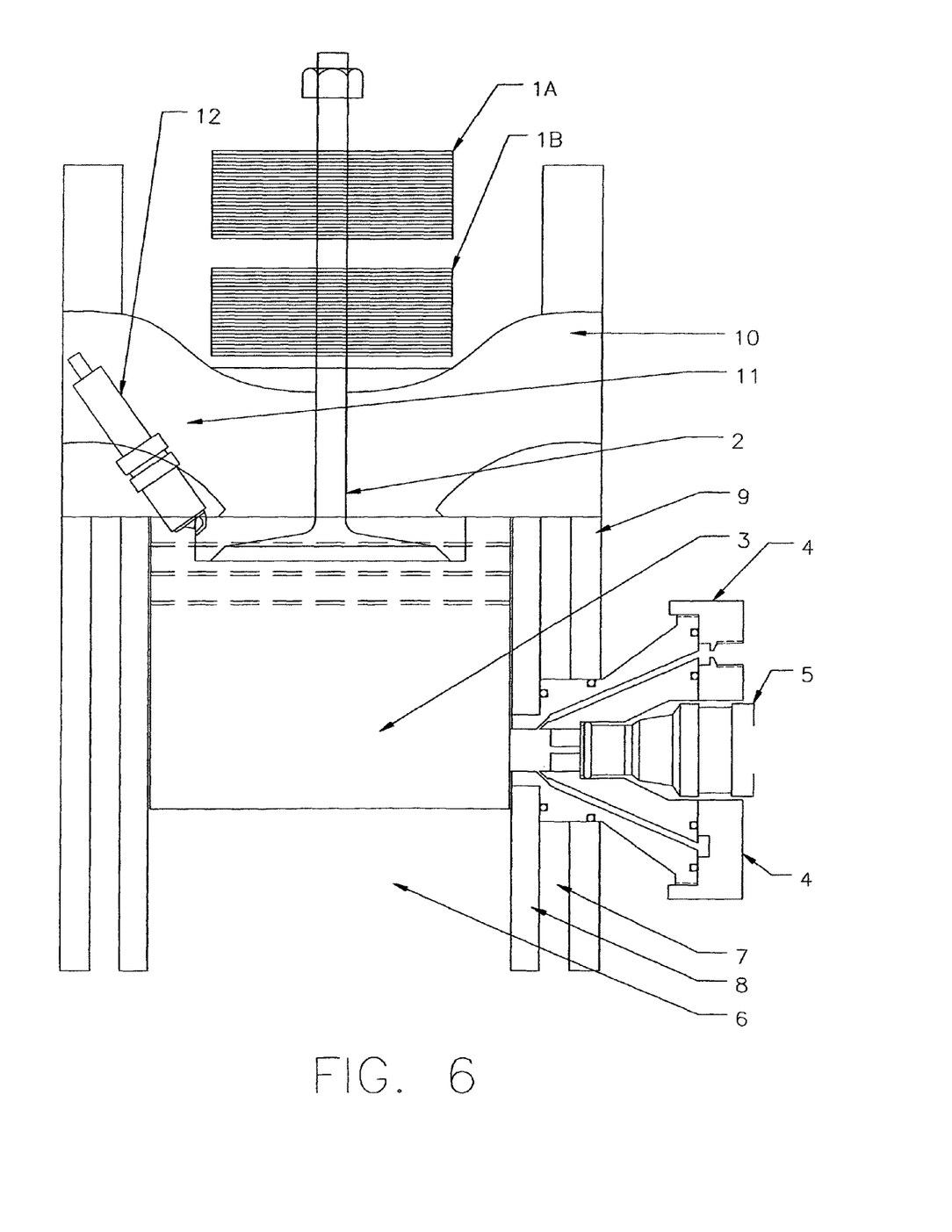
FIG. 6 is a schematic sectional view of the poppet valve still in the open position and the piston at the (TDC) top dead center, cleaning the cylinder of all air and gases.

FIG. 6 show the piston 3 at the point of completing the exhaust stroke. At the completion of the exhaust stroke only fresh air would have been expelled past the poppet valve 2 and out of the exhaust port bore 11, leaving only fresh air in the intake port bore 10 and exhaust port bore 11.

Figure 7:
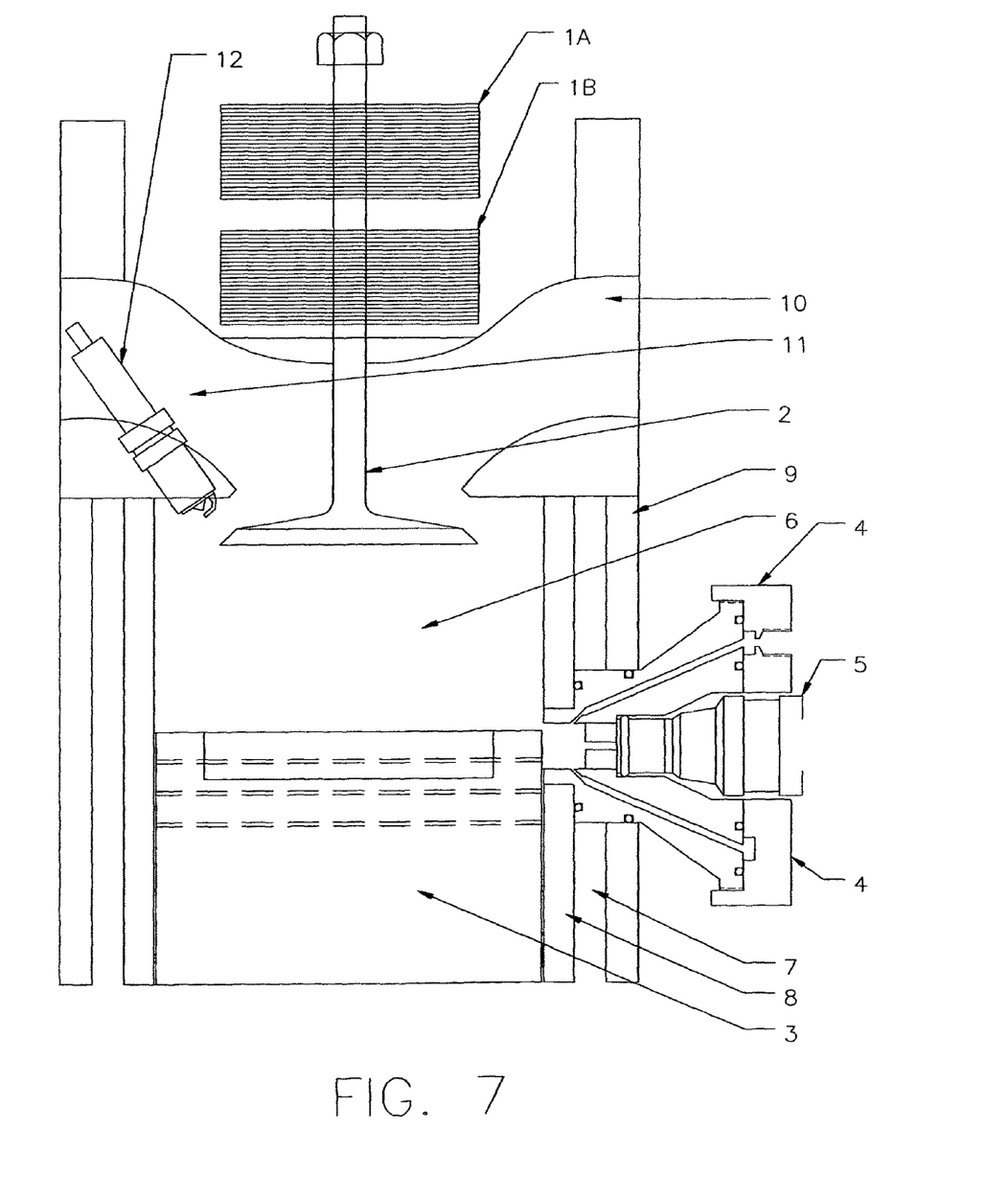
FIG. 7 is a schematic sectional view of the poppet valve remaining in the open position and the piston is in a downward motion forming the intake stroke. In this view the piston is drawing air into the cylinder past the poppet valve.

FIG. 7 shows the poppet valve 2 remaining in the open position. The piston 3 will be in a downward motion starting the intake stroke. On the intake stroke the piston 3 will produce a vacuum in the cylinder 6 causing air to be drawn past the poppet valve 2 into the cylinder 6.

Figure 8:
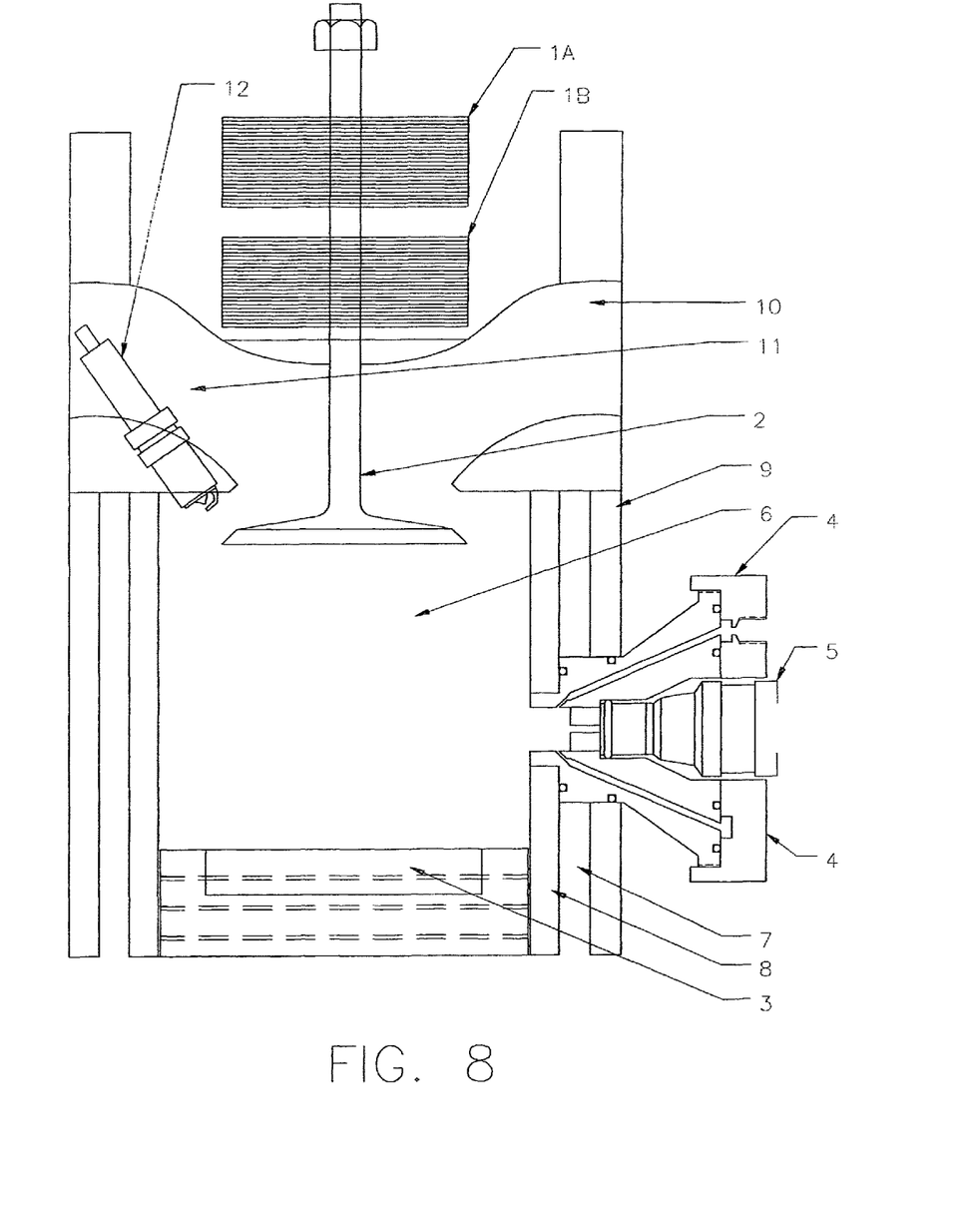
FIG. 8 is a schematic sectional view of the poppet valve in the open position. This action is still part of the air intake motion of the cylinder. At the same time the air injector is forcing cool fresh air into the cylinder.

FIG. 8 as the piston 3 passes the air fuel injection chamber 14, the air injector 4 will force fresh air into the cylinder 6, past the poppet valve 2 leaving only cool fresh air in the cylinder 6.

Figure 9:
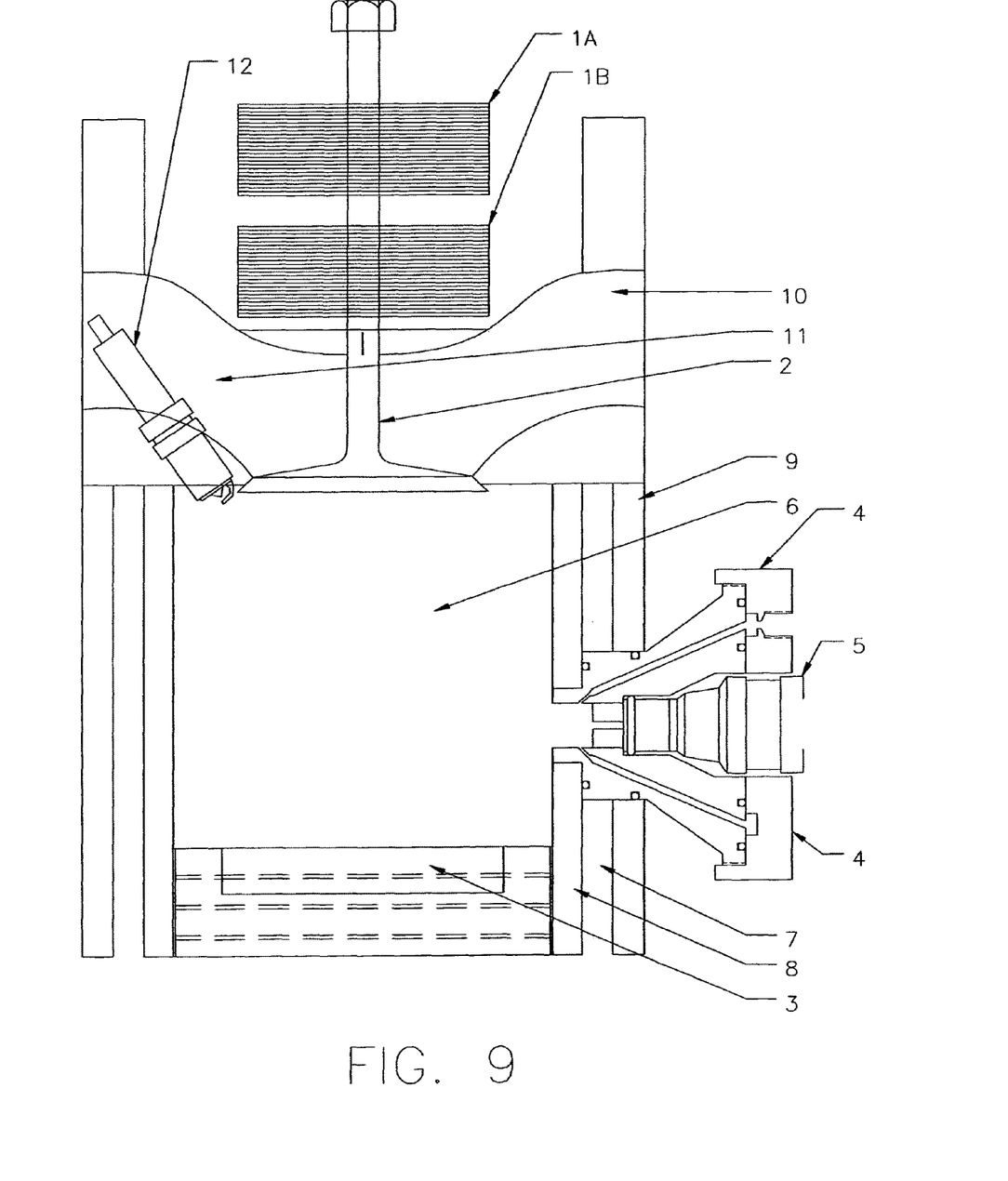
FIG. 9 is a schematic sectional view of the poppet valve in the closed position. When the piston is in the (BDC) bottom dead center position and the poppet valve is closed the air injector combined with the fuel injector will inject a fuel and air mixture into the cylinder at this position.

FIG. 9 show the poppet valve 2 closed and the piston 3 at bottom dead center (BDC) With the piston 3 at (BDC) the fuel injector 5 will inject the required amount of fuel Into the air fuel mixture chamber 14 at the same time the air injector 4 will inject air into the air fuel mixture chamber 14. The fuel is injected under high pressure to insure that the fuel droplets will remain small in size. The smaller the fuel droplets are the more power they will produce when injected into the air fuel mixture. It is at this time of the compression stroke that the fuel injector 5 and air injector 4 will determine the amount of fuel and air that is to be injected into the air fuel mixture chamber 14 and into the cylinder 6 to deliver the power required of the engine. If it is required that the engine is to perform at higher horsepower the air injector 4 can increase the air flow by increasing the air pressure into the air injector 4 produced by an external air compressor at same time increasing the fuel into the fuel injector 5. This process can increase the horsepower to be equal to a supercharged engine.

Figure 10:
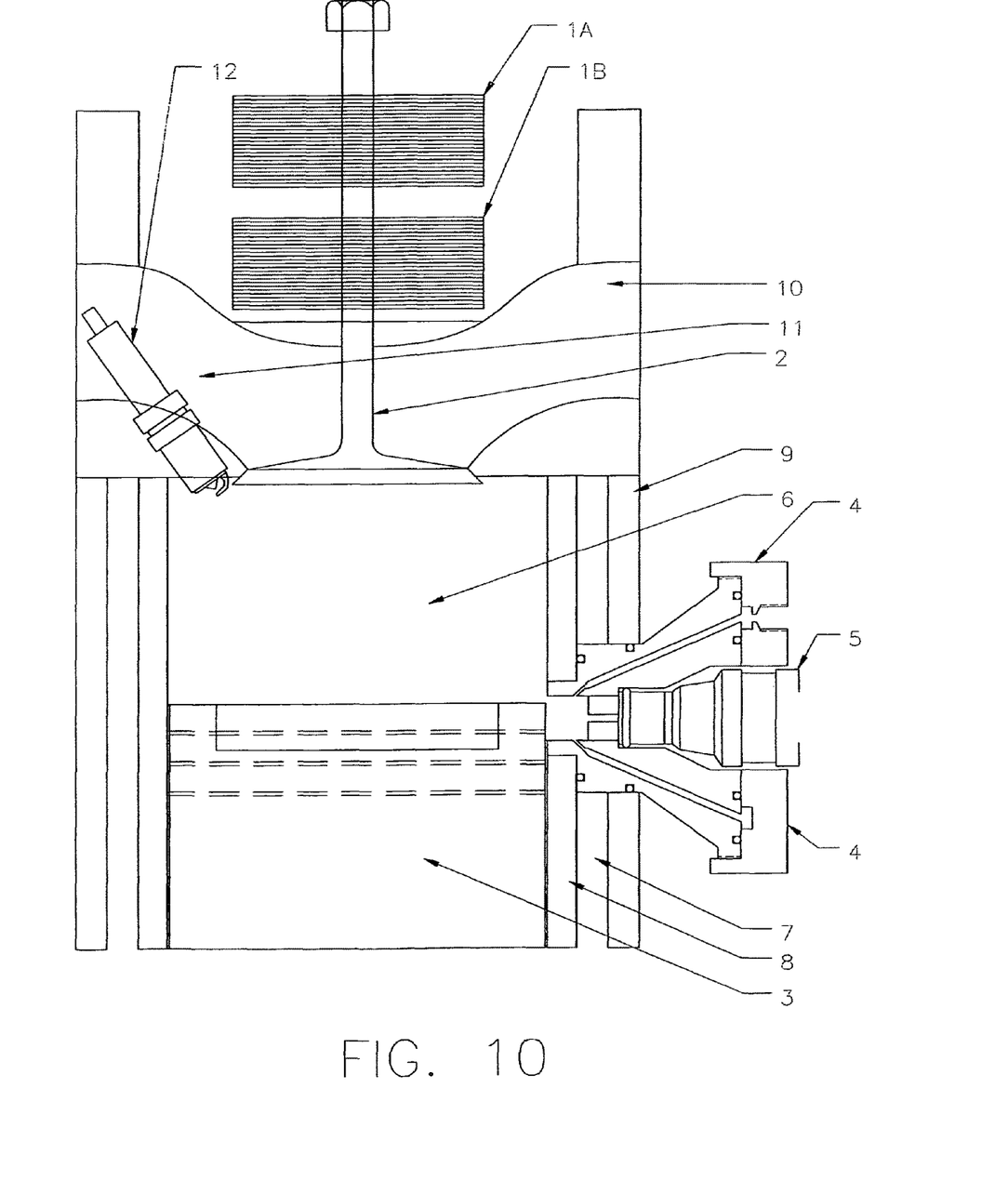
FIG. 10 is a schematic sectional view of the poppet valve closed and the piston completing the compression stroke which is shown in FIG. 1.

FIG. 10 shows the completion of the forth stroke of the four stroke internal combustion engine.

Figure 11:
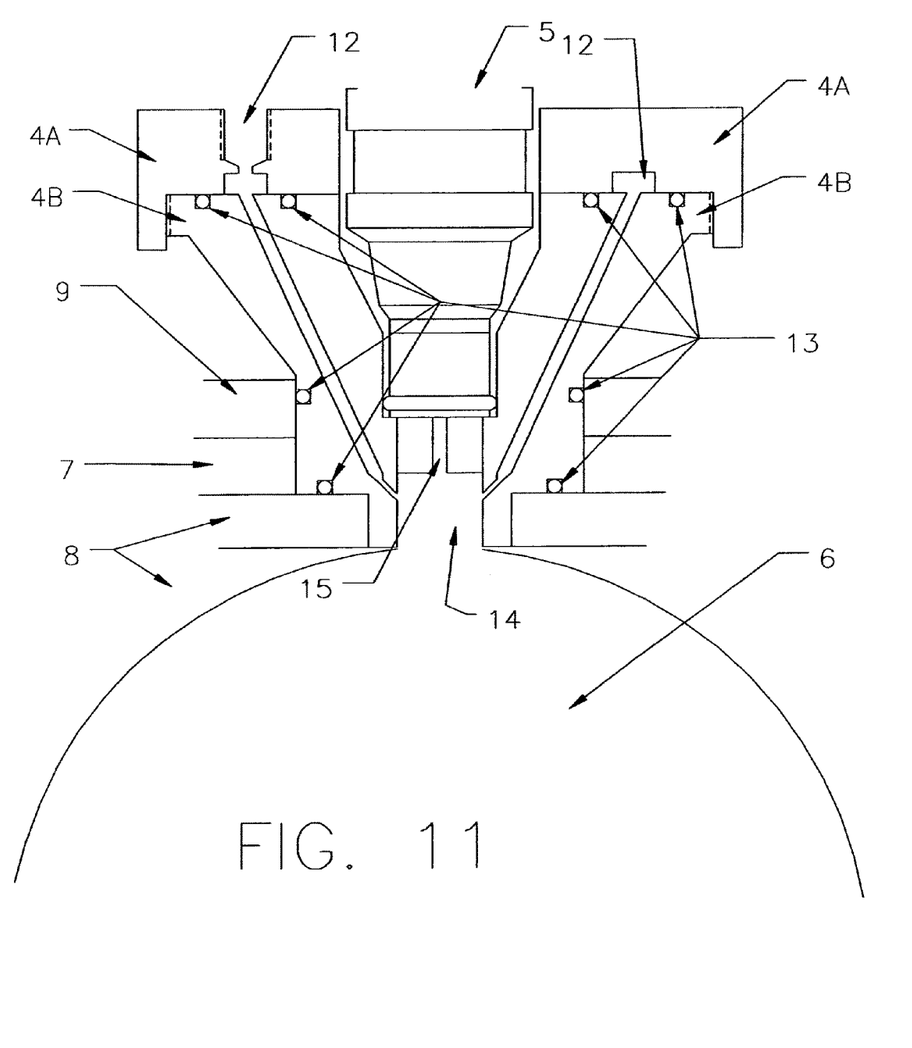
FIG. 11 is a schematic sectional view showing a enlarged view of the air injector and the fuel injector as it appears mounted to the engine.
Figure 12:
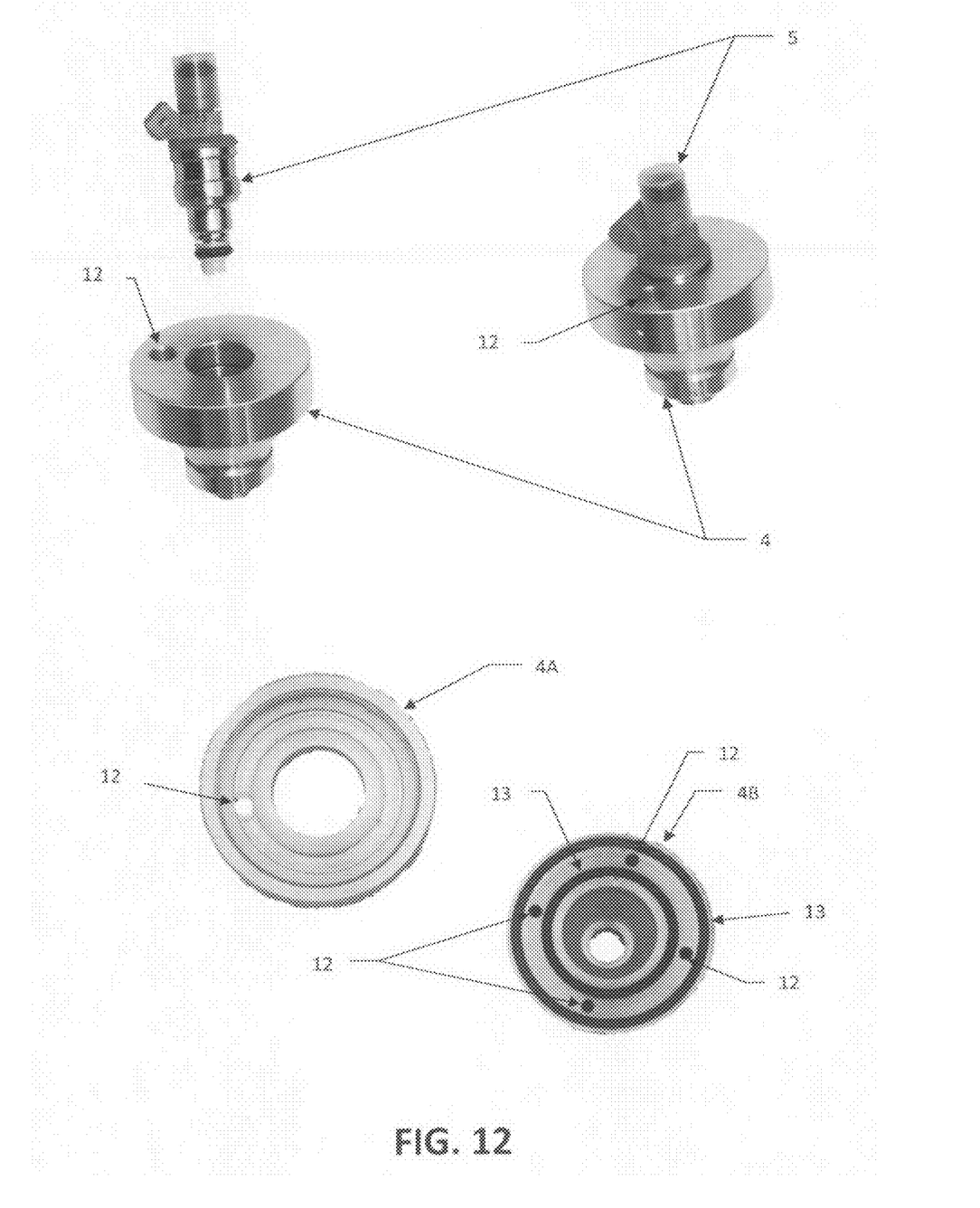
FIG. 12 are actual photos of the air injector and fuel injector separated, then combined and last the separated view of the air injector, showing how the top of the air injector receives the air through the single air vain into the air vain ring. The lower part of the air injector has two "O" rings which seals the air in the air vain ring so the air is forced into the four air vain which leads to the air fuel mixing chamber.

FIG. 11 is a schematic sectional view showing an enlarge view of the air injector 4 and fuel injector 5. FIG. 12 are photo's of FIG. 11. FIG. 11 shows the air injector 4 with each part of its makeup. 4A is the top section and 4 B is the bottom section. The two section screw together to form the complete air injector 4. They are separated by "O" rings 13 that form a seal around the air passage ways 12 in 4A and 4B. 13 represents the "O" rings that seal points of leakage when the air injector 4 is inserted into the engine block and the air fuel mixture chamber 14 is inserted through the cylinder wall into the cylinder 6. The water jacket is represented by number 7. The inner wall that forms the cylinder 6 and the exterior wall of the engine block is number 8. Air enter through the top of 4A from an exterior air compressor, The air is forced into a circular vain 12 between 4A and 4B to four air vain 12 running down through 4B to the air fuel mixing chamber 14 FIG. 11 is a schematic sectional view showing how the fuel injector 5 is pressed into the air injector body 4 so as to insert the fuel injector 5 end into the air fuel mixture chamber 14. At the end of the intake stroke and just before the start of the compression stroke while the air injector 4 is injecting fresh air into the air fuel mixture chamber 14 the fuel injector 5 will inject fuel through the fuel injector head 15 into the air fuel mixture chamber 14 after the air and fuel is mixed in the air fuel mixture chamber 14 it is expelled into the cylinder 6.

As the piston 3 passes the air and fuel mixture chamber 14 the piston will complete the compression stroke. Then the process will return to FIG. 1 and start over again. The engine also uses the crank fire ignition system where the spark plug 12 is fire every time the piston 3 reaches (TDC), no matter if it is being used as a four cycle or a two cycle engine Another unique feature of this invention is it can be change from a four cycle engine to a two cycle engine. The four cycle engine uses FIGS. 1 thru 10. To run as a two cycle engine just switch the program of the Electric Magnetic Solenoid poppet valve 2 to us only FIG. 1 ignition of the compression stroke, FIG. 2 the expansion stroke (power stroke) FIG. 3 Releasing of the compression in the cylinder 6. FIG. 4 The air injector 4 forcing the exhaust gases from the cylinder 6 and fresh air into the cylinder 6. FIG. 9 the poppet valve 2 is closed, the air injector 4 forcing fresh air into air fuel mixture chamber 14 and the fuel injector 5 injecting fuel into the air fuel mixture chamber 14 as the fresh air and fuel is mixed it is then expelled into the cylinder 6. FIG. 10 shows the continuing of the compression stroke. Finishing at FIG. 1 with the firing of the spark plug 12 and ignition of the air fuel mixture. This is accomplished by programming the Electric Magnetic Solenoid 1A and 1B to eliminate poppet valve 2 action of FIG. 5, FIG. 6, FIG. 7, and FIG. 8, and by programming the fuel injector 5 to eliminate FIG. 5, FIG. 6, FIG. 7, and FIG. 8.

Another unique feature of this invention is its ability to release the compression of any cylinder 6 and to stop the injection of fuel to any cylinder 6 at any given time. It is accomplished by picking any given cylinder 6 and having the Electric Magnetic Solenoid 1A and 1B to move the poppet valve 2 to the open position and having the poppet valve 2 remain in the open position as long as that cylinder 6 is not needed for the performance of the engine. At the same time shut down the fuel injector 5 to same cylinder 6 giving the engine greater fuel economy.

The inventor claims:

1. An internal combustion engine comprising:
a plurality of cylinders of predetermined dimension;
a cylinder head having a cylinder head opening; said cylinder head opening allowing the by-products of combustion to be exhausted;
a plurality of pistons; said pistons being encased by the cylinders; wherein said pistons will travel within the cylinders during operation of the internal combustion engine;
a plurality of poppet valves; said poppet valves having a stem and a flanged portion; wherein said poppet valves will open and close during the operation of the internal combustion engine;
wherein only one of said poppet valves is provided per cylinder;
wherein a portion of each poppet valve is mated to an opening in the cylinder head;
electromagnetic means for operating the plurality of poppet valves;
wherein the operation of opening and closing of the poppet valves is determined based on predetermined factors;
wherein the means for operating the plurality of poppet valves act independently of each other;
a means for igniting the fuel;
wherein a portion of the means to ignite the fuel is place in the cylinder head;
an air and fuel mixing chamber having means to inject a predetermined amount of fuel and air into the cylinder is provided;
wherein an air injector is mounted on the air and fuel injector mixing chamber;
wherein a fuel injector is mounted on the air and fuel injector mixing chamber;
wherein the air and fuel injector mixing chamber is secured to a portion of the cylinder surface;
wherein the air and fuel mixing chamber is mounted in the lower portion of the cylinder wall substantially one third of the distance above the position of the piston at bottom dead center of the combustion cycle;
wherein the input of air and fuel through the air and fuel injection mixing chamber is based on predetermined factors;
wherein a predetermined amount of fuel and air is provided through the air and fuel injector mixing chamber;
wherein a means to shut off the fuel supply to a cylinder is provided;
said pre-determined amount of fuel and air is injected into the cylinder when the poppet valve is mated to the surface of the cylinder head.

2. An internal combustion engine as in claim 1, wherein the electromagnetic means for operating the plurality of poppet valves comprises a plurality of electromagnetic solenoids.

3. An internal combustion engine as in claim 1, wherein the operation of opening and closing of the poppet valves is performed automatically.

4. An internal combustion engine as in claim 1, wherein the means for igniting the fuel comprises a spark plug.

* * * * *